United States Patent
Terada

(10) Patent No.: US 7,307,215 B2
(45) Date of Patent: Dec. 11, 2007

(54) WIRING HARNESS SLACK ABSORBING DEVICE

(75) Inventor: Tomoyasu Terada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/564,955

(22) PCT Filed: Jul. 27, 2004

(86) PCT No.: PCT/JP2004/010659

§ 371 (c)(1),
(2), (4) Date: Jan. 18, 2006

(87) PCT Pub. No.: WO2005/013452

PCT Pub. Date: Feb. 10, 2005

(65) Prior Publication Data

US 2006/0175073 A1 Aug. 10, 2006

(30) Foreign Application Priority Data

Jul. 30, 2003 (JP) ............................... 2003-203590

(51) Int. Cl.
*H01B 7/00* (2006.01)
(52) U.S. Cl. ................... 174/72 A; 174/68.3; 174/73.1
(58) Field of Classification Search ............. 174/72 A, 174/68.3, 73.1
See application file for complete search history.

(56) References Cited

U.S. PATENT DOCUMENTS 5,877,936 A * 3/1999 Nishitani et al. ............. 439/34

FOREIGN PATENT DOCUMENTS

| JP | 2-97830 | 8/1990 |
|---|---|---|
| JP | 2001-103644 | 4/2001 |
| JP | 2001-218350 | 8/2001 |
| JP | 2002-67828 | 3/2002 |
| JP | 2002-325347 | 11/2002 |

\* cited by examiner

*Primary Examiner*—Jinhee Lee
(74) *Attorney, Agent, or Firm*—Kratz, Quintos & Hanson, LLP

(57) ABSTRACT

There is provided a wiring harness slack absorbing device (10) being able to receive a folded part (51) of a wiring harness (25) without protrusion on a case body (31), so that a slim case is used for the device (10). The device (10) includes the case (30) for receiving the wiring harness (25) having an inlet 34 and an outlet (35) for the wiring harness (25), an urging member (23) for pulling the wiring harness (25) into the case (30), and a harness roller (15) moving reciprocally under an urging force of the urging member (23). The inlet 34 is disposed perpendicular to the outlet (35). The space for receiving folded part (20) is provided between the case (30) and the urging member (23). The folded part (51) of the wiring harness (25) is led through the inlet and received in the space for receiving folded part (20). A center axis of the urging member (23) is displaced from a center plane of the harness roller (15) in a direction of thickness of the case (30) so as to provide the space for receiving folded part (20).

2 Claims, 2 Drawing Sheets

WIRING HARNESS SLACK ABSORBING DEVICE

TECHNICAL FIELD

This invention relates to a device for absorbing a slack of a wiring harness interposed between a vehicle body as a fixed object to which the wiring harness is fixed, and an openable and closable door as a sliding object mounted on the vehicle body.

BACKGROUND ART

As is generally known, various electric components are installed in a vehicle or the like. Power and signal currents are supplied to these electric components through a wiring harness.

The wiring harness is a tube that ties a plurality of electric wires. Various wiring harnesses are used corresponding to applications or locations. For example, a flexible flat cable in which a plurality of wiring conductors are arranged in parallel is used for connecting electric components in a vehicle door on which a power window motor, a door lock unit, a switch unit, an automatic door open/close unit and the like are installed.

Travel distance of the wiring harness for the door or the like is large due to the open/close of the door. Therefore, when the door is closed, a slack is generated in the wiring harness and may be caught between the vehicle body and the door and damaged. An example of a conventional wiring harness slack absorbing device 50 for solving such a problem is shown in FIG. 6.

As shown in FIG. 6, the slack absorbing device 50 includes: a wiring harness 25; a case 30 having a case body 31 and a cover 37; and a slack absorbing unit 12 received in the case 30.

A so-called flat wiring harness such as a flexible flat cable (FFC) is used as the wiring harness 25. The case body 31 is a horizontally rectangular box having an opening. A harness outlet 35 is mounted on a rear wall of the case body 31. A not-shown harness inlet is mounted on a sidewall perpendicular to the rear wall. Namely, the outlet 35 and the inlet are disposed perpendicular to each other. The wiring harness 25 is led into the case 30 through the inlet, and led out of the case 30 through the outlet 35.

The cover 37 covers the opening of the case body 31. A not-shown locking piece is formed on a frame of the case body 31. A not-shown locking projection is formed on a frame 38 of the cover 37. By engaging the locking piece with the locking projection, the cover 37 is attached to the case body 31.

The slack absorbing unit 12 includes a seat member 13, a guiding pin 27, a compressed coil spring 23, and a harness roller 15. The guiding pin 27 is arranged in a longitudinal direction of the case body 31. One end of the guiding pin 27 is fixed to the rear wall of the case body 31.

The compressed coil spring 23 is installed to cover the guiding pin 27 and to push the wiring harness 25 toward the case 30. The harness roller 15 has a trunk to be attached to the guiding pin 27. The harness roller 15 is allowed to reciprocally move in a direction to pulling in/out the wiring harness 25 rolled in a U-shape thereon.

Thus, a slack 26 of the wiring harness 25 is pulled into or out of the case 30 accompanying the open/close of the door or the like. Therefore, the wiring harness 25 is constantly strained and the damage of the caught slack 26 is prevented.

DISCLOSURE OF THE PRESENT INVENTION

Problem to be Solved by the Invention

However, there are problems to be solved in the conventional wiring harness slack absorbing device 50 as described below.

One problem is that a folded part 51 formed integrally with the inlet protrudes outward from a base wall 31a of the case body 31. This is because the wiring harness 25 led into the case body 31 is folded and bent at 90 degree, thereby a thickness of the wiring harness 25 is double at the folded part 29 so that a double space is required to receive the folded part 29.

Accordingly, an object of the present invention is to provide a wiring harness slack absorbing device to receive a folded part of a wiring harness without an outer protrusion on a case body and allow the case body to be slim.

Means for Solving the Problem

For attaining the object, according to the present invention, there is provided a wiring harness slack absorbing device including:

a case for receiving a wiring harness having an inlet and an outlet for the wiring harness, said inlet being perpendicular to the outlet;

an urging member for urging the wiring harness toward an inside of the case; and a harness roller around which the wiring harness being rolled, said harness roller reciprocally moving under acting force of the urging member, wherein a space for receiving folded part is provided between the case and the urging member, wherein a folded part of the wiring harness is led into the case through the inlet and received in the space for receiving folded part.

According to the above, when pulling force larger than urging force of the urging member acts on the wiring harness, the wiring harness is pulled out of the case. Otherwise, the wiring harness is pulled into the case. Therefore, the wiring harness is prevented from being broken by the pulling force. The wiring harness with no slack is also prevented from being caught between a vehicle body as a fixed object and a door as a sliding object, and thereby prevented from being broken at the slack of the wiring harness.

Since the inlet and the outlet are disposed perpendicular to each other, the wiring harness is allowed to be folded, bent at bent at 90 degree and led into the case through the inlet. Further, since the space for receiving folded part is provided between the case and the urging member inside the case, the folded part of the wiring harness is allowed to be received inside the case.

According to the present invention, there is provided the wiring harness slack absorbing device, wherein a center axis of the urging member is displaced from a center plane of the harness roller in a direction of thickness of the device for providing a larger space for receiving folded part.

According to the above, since the center axis of the urging member is decentered relative to the center plane of the harness roller in the direction of thickness of the device, a gap between the case and the urging member increases to provide a larger space as the space for receiving folded part inside the case.

Effect of Invention

According to the present invention as described above, since the space for receiving folded part is formed inside the case, the folded part of the wiring harness is received inside the case. Therefore, an outer protruding part of the case for receiving the folded part is not required. A slim case is allowed to be used for the wiring harness slack absorbing device.

Figure 1:
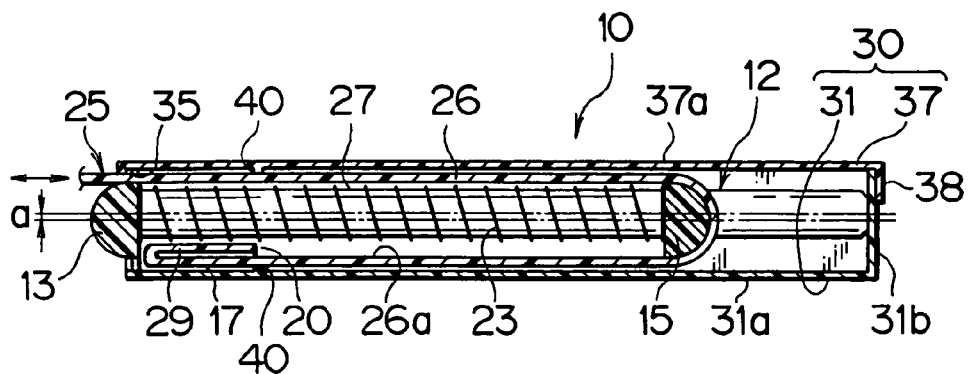
FIG. 1 is a longitudinal sectional view showing a wiring harness slack absorbing device according to an embodiment of the present invention.

EXPLANATIONS OF LETTERS OR NUMERALS 10 wiring harness slack absorbing device
15 harness roller
20 space for receiving folded part
23 compressed coil spring
25 wiring harness
27 guiding pin (guided member)
29 folded part of the wiring harness
30 case
34 harness inlet (inlet)
35 harness outlet (outlet)

BEST MODE FOR CARRYING OUT THE INVENTION

Hereunder, an embodiment of the present invention will be explained with reference to figures. FIGS. 1 to 5 show a wiring harness slack absorbing device 10 according to the embodiment of the present invention. In order to avoid repetitions, identical elements will be designated by identical reference numerals and only the differences existing in comparison with the embodiment of the conventional wiring harness slack absorbing device 50 will be explained.

The wiring harness slack absorbing device 10 absorbs a slack 26 of a wiring harness 25 interposed between a vehicle body as a fixing object (not shown) and a door as a movable object (not shown). Here, a scope of the door includes a rotary door or sliding door. The movable object is not limited to the door. For example, a trunk or a hatch may be used as the movable object.

As shown in FIG. 1, the wiring harness slack absorbing device 10 includes the wiring harness 25 as a flat circuit body, a case 30 made of synthetic resin, a slack absorbing unit 12 received in the case 30.

A band-shaped flexible flat cable (FFC), of which parallel wiring conductors are covered by insulating covering material 25a, is used as the wiring harness 25. However, any cable is acceptable as long as the cable is foldable in a curve shape. A flexible print circuit (FPC) may be used as the wiring harness 25.

Both the FFC and the FPC are coated wires to carry mainly signal currents between electric components of the vehicle. The number of wires corresponds to the number of terminals received in connectors (not shown) disposed at the vehicle body or the door. The covering material 25a covering the electric wires is formed in a so-called insulating sheet made of polyvinyl chloride, polyethylene, or the like.

The FFC and the FPC are flexible and are foldable in a desired shape corresponding to a wiring route. Accordingly, even when the FFC and the FPC are folded in a U-shape and received in the wiring harness slack absorbing device 10, the FFC and the FPC have no damage, and reliability of electrical connection with the FFC and the FPC is not reduced.

The case 30 includes a case body 31 and a cover 37. The case 31 is formed in a box shape having an opening at a top thereof, a lower base wall 31a, and frame walls standing on edges of the base wall 31a.

Figure 2:
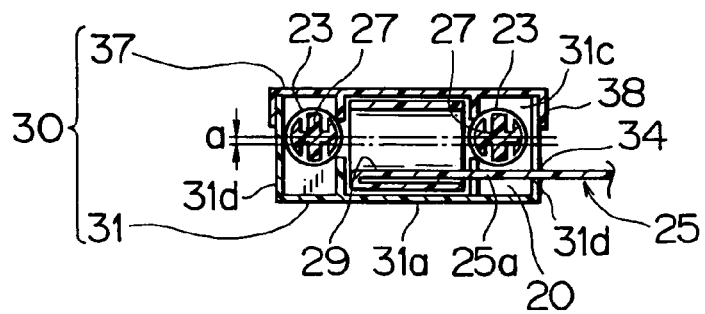
FIG. 2 is a cross sectional view showing the wiring harness slack absorbing device according to the present invention.

The top of the case 30 is open. The frame walls are in lateral rectangular shapes. The frame walls include a front and rear walls 31b, 31c opposite to each other (FIG. 4), and both sidewalls 31d, 31d opposite to each other (FIG. 2). L-shaped locking pieces 32 for locking the cover 37 are formed on the rear and front walls 31b, 31c and the sidewalls 31d, 31d (FIG. 5).

Not-shown clipping ribs and not-shown clipping projections are formed on an inner wall of the front wall 31b. Each one pair of the clipping rib and the clipping projection is disposed on top and bottom parts of one guiding pin 27 (guiding member), so that the pair of the clipping rib and the clipping projection catches and holds the guiding pin 27. The clipping rib and the clipping projection will be explained in the other patent application, and further explanation will be omitted in this application.

A notched harness outlet (outlet) 35 is formed on the rear wall 31c. The outlet 35 is formed near the opening of the case body 31. A slot-shaped harness inlet (inlet) 34 (FIG. 2) is formed near the rear wall 31c.

The reason why the harness inlet 34 and the harness outlet 35 are disposed perpendicular to each other is that the wiring harness 25 led into the case body 31 through the inlet 34 and the same led out through the harness outlet 35 are prevented from interfering with each other for smoothly leading in and out the wiring harness 25 without any catch.

Figure 3:
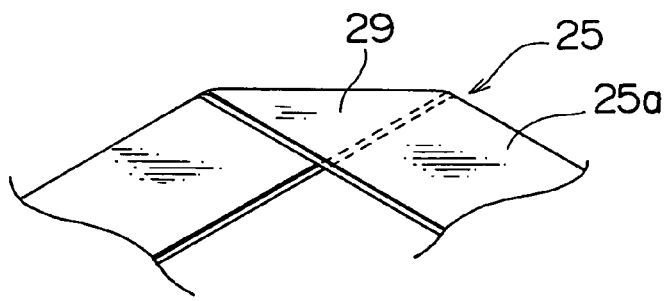
FIG. 3 is a perspective view showing a folded wiring harness to be led into a case through an inlet of the wiring harness slack absorbing device according to the present invention.
Figure 6:
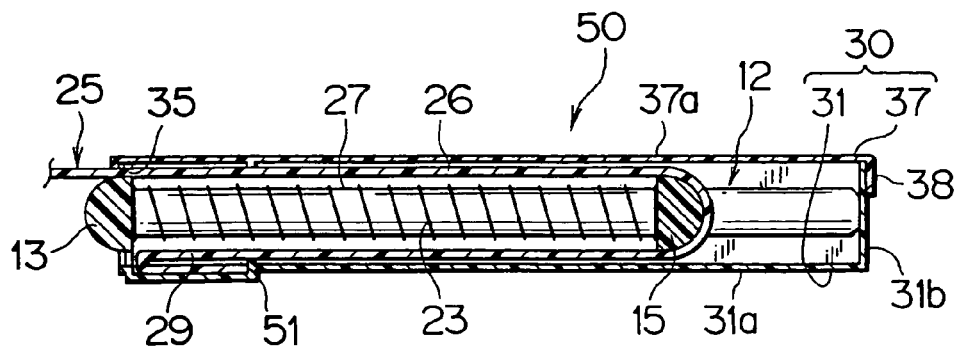
FIG. 6 is a sectional view showing an embodiment of a conventional wiring harness slack absorbing device.

The wiring harness 25 is led into the case body 31 through the harness inlet 34, so that the wiring harness 25 including the folded part 29 (FIG. 3) is received inside the case body 31. The folded part 29 is, as shown in FIG. 3, an overlap formed by firstly folding the wiring harness 25, then bending the wiring harness 25 at 90 degree.

As shown in FIG. 1, the wiring harness 25 led into the case body 31 through the harness inlet 34 (FIG. 2) is received in the case body 31 in a manner that turns the folded part 29 upward. Namely, the folded part 29 and an inlet side part 27a are arranged to face the compressed coil spring 23 (urging member).

Then, the wiring harness 25 led inside the case 30 is rolled around the harness roller 15, turned in a U-shape, and led out through the harness outlet 35. In the conventional wiring harness slack absorbing device 50, the folded part 29 is arranged toward the base wall 31a of the case body 31, thereby differs from a structure of this embodiment.

A width of the opening of the harness inlet 34 is formed equivalent to or more than that of the wiring harness 25, and equivalent to or more than a thickness of the folded part 29 of the wiring harness 25.

The wiring harness 25 including the folded part 29 led into the case 30 through the harness inlet 34 is received in the space 20 for receiving folded part provided integrally with the harness inlet 34 at the base wall 31a of the case body 31. Thus, a first characteristics of the present invention is to provide the space 20 for receiving folded part for receiving the folded part 29 inside the case body 31.

The space 20 for receiving folded part is a space provided between the base wall 31a and the compressed coil spring 23. The space 20 for receiving folded part is provided in a wider space inside the case body 31 by displacing center axis of the compressed coil springs 23 from a center plane of the harness roller 15 in a direction of thickness of the case 30.

Namely, since the compressed coil springs 23 are disposed at an upper side of the case body 31, the center axis of the compressed coil spring 23 are displaced upward from the center plane of the harness roller 15. Therefore, an additional space corresponding to the displacement "a" (FIG. 1) of the compressed coil spring 23 is provided at a lower part of the case body 31, in which the folded part 29 of the wiring harness 25 is received.

Size of the case body 31 and a structure of the harness roller 15 are the same as those in the conventional wiring harness slack absorbing device 50. Only changing the position of the compressed coil spring 23 allows the wiring harness slack absorbing device 10 to make a space to receive the folded part 29 of the wiring harness 25 with no outer protrusion from the case body 31.

The folded part 29 of the wiring harness 25 is disposed at the rear wall 31c side of the space 20 for receiving folded part. The folded part 29 does not move, and the harness roller 15 moves back and forth relative to the folded part 29. A reason why the folded part 29 is disposed at the rear wall side is to increase movement of the harness roller 15 and thereby increase the amount of absorbable slack of the wiring harness 25.

The wiring harness 25 received in the case body 31 is constantly urged in a direction to draw the wiring harness 25 toward the inside of the case body 31. Therefore, when the wiring harness 25 is to be led out of the case 30, the wiring harness 25 is pulled outward. When the wiring harness 25 is to be led into the case 30, the wiring harness 25 is no longer pulled outward.

The movement of the harness roller 15 in a direction of leading out the wiring harness 25 is stopped at a pair of stopper 40, 40 respectively disposed against the inner wall of the case body 31 and against the inner wall of the cover 37. Therefore, the harness roller 15 does not interfere with the folded part 51 of the wiring harness 25.

As shown in FIG. 1, the wiring harness 25 is led out of the harness outlet 35 in a horizontal direction. However, a not-shown harness guide may be formed on the harness outlet 35 for guiding the wiring harness 25 in a predetermined direction. For example, when the wiring harness 25 is to be led out downward, the harness guide may be formed downward. Leading out the wiring harness 25 along the harness guide prevents concentration of bending stress acting on the wiring harness 25 at a specific part. Therefore, damage of the wiring harness 25 such as a break in the wiring harness 25 is prevented. Incidentally, the harness guide will be explained in the other patent application and therefore, omitted in this application.

The cover 37 is formed in a shape so as to cover the opening of the case body 31. The cover 37 includes a ceiling wall 37a and frame walls 38 extending downward from edges of the ceiling wall 37a. There is an opening at a bottom of the cover 37. Locking projections 38a (FIG. 5) are formed on the frame walls 38 of the cover 37 for engaging with the locking pieces 32 formed on the frame walls of the case body 31.

Since the case 30 absorbs the slack 26 of the wiring harness 25, it is prevented that the U-shaped slack 26 is exposed to the outer interference, and the slack 26 is broken or damaged. Further, the ceiling wall 37a and the base wall 31a facing to each other prevent the absorbed slack 26 from lifting.

The slack absorbing unit 12 includes a seat member 13, the guiding pin 27, the compressed coil spring 23 surrounding the guiding pin 27, and the harness roller 15 around which the wiring harness 25 is rolled in a U-shape.

Figure 4:
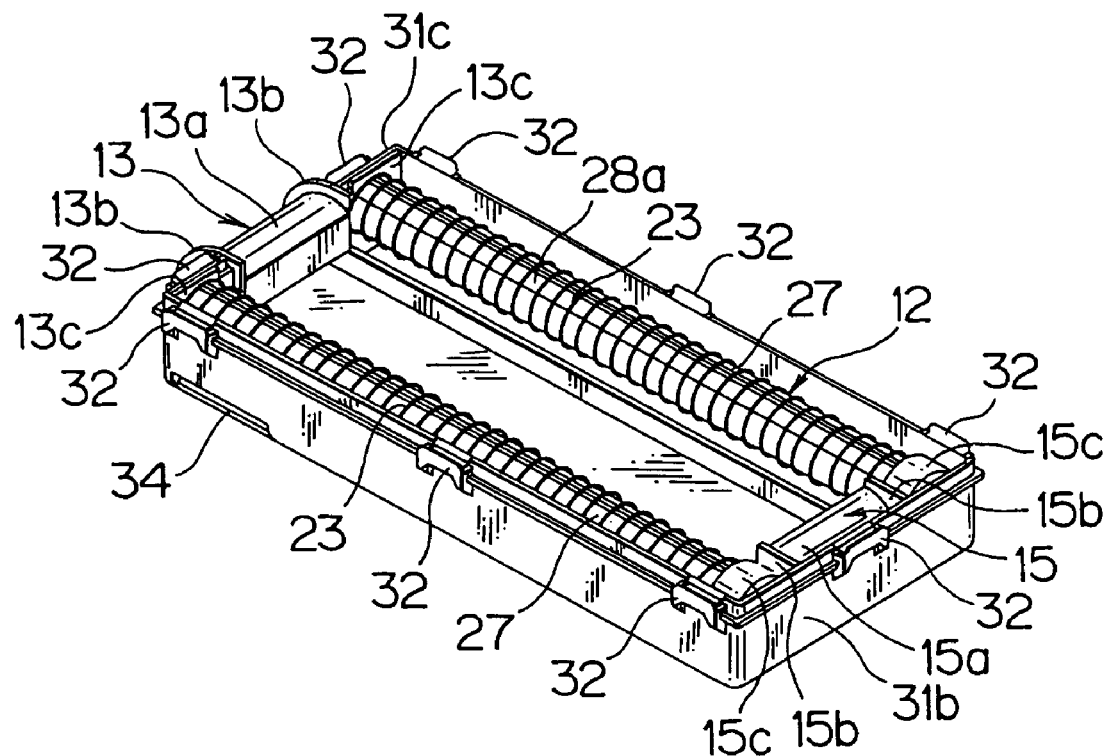
FIG. 4 is a perspective view showing a case body receiving a slack absorbing unit of the wiring harness slack absorbing device according to the present invention.
Figure 5:
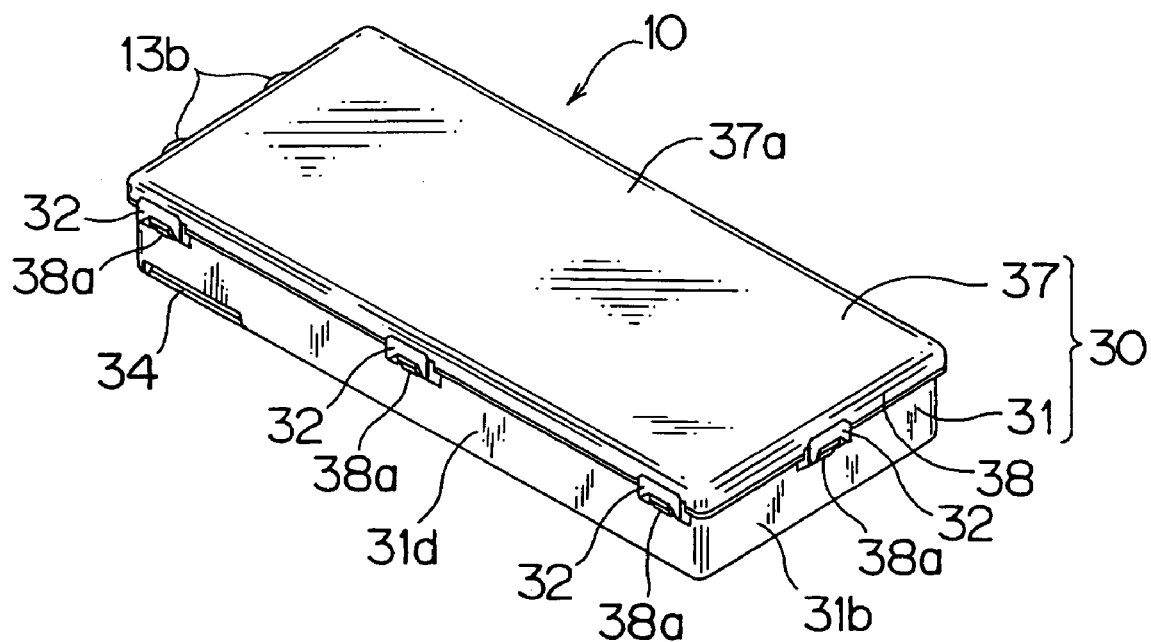
FIG. 5 is a perspective view showing the case body covered by a cover according to the present invention.

As shown in FIG. 4, the seat member 13 is made of synthetic resin, and formed integrally by injection molding. The seat member 13 includes a trunk 13a, plates 13c disposed at both sides of the trunk 13a, and separators 13b for separating the trunk 13a from the plates 13c.

An outer projecting curved wall is formed at one side of the trunk 13a, and an inner flat wall is formed at the other side of the trunk 13a. The curved wall smoothly guides the wiring harness 25 into the case 30 when the wiring harness 25 is drawn. Namely, the seat member 13 guides the wiring harness 25 when the wiring harness 25 is pulled inward or outward through the harness outlet 35. Incidentally, the seat member 13 and the guiding pin 27 may be formed integrally with each other.

The separators 13b projecting from both ends of the trunk 13a position the wiring harness 25 rolled around the trunk 15a so as not to displace the wiring harness 25 laterally.

The plates 13c are formed so as to continue to both sides of the trunk 13a through the separators 13b, and to be parallel with the flat wall of the trunk 13a. These plates 13c are opposite to frames 15c (attaching parts) disposed at both sides of the harness roller 15. Guiding pins 27 are formed vertically at both plates 13c respectively.

The guiding pin 27 is a straight member in a bar shape, and made of synthetic resin. One end of the guiding pin 27 is a fixed end to the rear wall 31c of the case body 31. The other end of the guiding pin 27 is a free end, however, fixed to the harness roller 15.

A length of the guiding pin 27 is formed shorter than that of the case 30. That is because if the guiding pin 27 is longer than the case 30, the case 30 cannot receive the guiding pin 27. Further, a maximum outer diameter of the guiding pin 27 is formed smaller than an inner diameter of the compressed coil spring 23. That is because if the maximum outer diameter is larger than the inner diameter of the compressed coil spring 23, the compressed coil spring 23 cannot receive the guiding pin 27 inside.

The compressed coil spring 23 is formed of many turns of a wire in a cylinder shape. A pair of the compressed coil springs 23 are disposed in parallel with each other (only one compressed coil spring 23 is shown in FIG. 1). Arranging the pair of the compressed coil springs 23 allows the harness roller 15 to move reciprocally while balancing. This is due to an increase of following ability of the wiring harness 25 to a movable door being opened and closed, because the pair of the compressed coil springs 23 increases the urging force and the wiring harness 25 is pulled into the case 30 swiftly. Further, the pair of the compressed coil springs 23 are prevented from being deformed and a fatigue life of the compressed coil spring 23 is increased in use for a reciprocally opened and closed door.

A length of the compressed coil spring 23 in a free state is about one-and-a-half times longer than that of the guiding pin 27. When the length of the compressed coil spring 23 is too long, pulling force to pull the wiring harness 25 inward is large so that the wiring harness 25 is, easier to be pulled inward. However, pulling force to pull the wiring harness 25 outward is required to be large so that the wiring harness 25 is harder to be pulled outward.

Conversely, when the length of the compressed coil spring 23 is too short, the force to pull out the wiring harness 25 inward is small so that the wiring harness 25 is easier to be pulled outward. However, since the force to pulled the wiring harness 25 inward is weak, the wiring harness 25 is harder to be pulled inward. Accordingly, in this embodiment, for pulling the wiring harness 25 both inward and outward smoothly, the length of the compressed coil spring 23 is predetermined to be about one-and-a-half times longer than that of the guiding pin 27. Similarly, the numbers of turns of the compressed coil spring 23 and a diameter of the wire are predetermined so as to pull the wiring harness 25 both inward and outward smoothly.

Using the compressed coil spring 23 as the urging member, interposing the wiring harness 25 between the pair of the compressed coil springs 23, and rolling the wiring harness 25 in a U-shape allows the length of the case to be about half the length of the slack 26 of the wiring harness 25. Therefore, there is a merit that the case 30 can be miniaturized. Conventionally, the case 30 having the compressed coil spring 23 is large and heavy. According to the present invention, such a problem is solved.

The harness roller 15 is made of synthetic resin, and includes the trunk 15a, the separators 15b, and the frames 15c continuing to the both sides of the trunk 15a and attached to the guiding pins 27. The trunk 15a and the frames 15c continue to each other through the separators 15b. The harness roller 15 moves reciprocally along the guiding pins 27 while urged by the compressed coil springs 23.

The wiring harness 25 is rolled in a U-shape on the trunk 15a. An outer convex wall is formed at one side of the trunk 15a. An inner flat wall is formed at the other side of the trunk 15a. The wiring harness 25 being smoothly bendable along the concave wall is prevented from being folded, thereby stress concentration caused at a folded part of the wiring harness 25 is avoided.

The separators 15b projecting from both sides of the trunk 15a are similar to the separators 13b of the seat member 13, and position the wiring harness 25 rolled around the trunk 15a so as not to displace the wiring harness 25 laterally.

An interval between the separators 15b is a little wider than a width of the wiring harness 25 so that the laterally shifted wiring harness 25 may not interfere with the compressed coil springs 23.

The frames 15c each having a frame shape continue to the both sides of the trunk 15a through the separators 15b. A tip of the guiding pin 27 is attached to an inside of each frame 15c. The frame 15c is movable reciprocally on the guiding pin 27, but not slips out of the guiding pin 27 after attached to the guiding pin 27. Since an engagement structure between the frame 15c and the guiding pin 27 will be explained in detail by another patent application, the explanation of the structure is omitted in this description.

Next, an assembling of the wiring harness slack absorbing device 10 will be explained. FIG. 4 shows the case body 31 receiving the slack absorbing unit 12. FIG. 5 shows the case body 31 covered by the cover 37.

Firstly, the compressed coil spring 23 covers the guiding pin 27 attached to the seat member 13. Resultingly, the compressed coil spring 23 projects from the tip of the guiding pin 27. This is because the length of the compressed coil spring 23 is about one-and-a-half times longer than that of the guiding pin 27.

The harness roller 15 is attached to the tip of the guiding pin 27, thereby the compressed coil spring 23 is compressed and a tip of the compressed coil spring 23 contacts the end of the harness roller 15. FIG. 4 shows the compressed coil spring 23 being compressed. A locking member locks the harness roller 15 and the guiding pin 27 so as not to slip out and retain the compression of the compressed coil spring 23. Further, a not-shown rib prevents the harness roller 15 from shifting laterally in a radial direction of the compressed coil spring 23.

Then, while the compressed coil spring 23 is compressed to be shorter than the length of the case 31, the case body 31 is assembled with the absorbing unit 12. Then, as shown in FIG. 5, the cover 37 covers the opening of the case body 31, and the locking pieces 32 engage with the locking projections 38a. Thus, the wiring harness slack absorbing device 10 is assembled completely.

The wiring harness 25 has the absorbed slack 26 received in the case 30. The wiring harness 25 is firstly led into the case 30 through the harness inlet 34 mounted on the sidewall 31d of the case body 31. Then, the wiring harness 25 is rolled in a U-shape on the harness roller 15, and led out of the case 30 through the harness outlet 35 mounted on the rear wall 31c of the case body 31.

The lead-out wiring harness 25 is connected to a connector harness connected to such as a vehicle door, and the electric components of a vehicle so as to supply electricity or signal currents.

According to this embodiment described the above, displacing the center axis of the compressed coil spring 23 from the center plane of the harness roller 15 in a direction of thickness of the case 30 makes a space 20 for receiving folded part for receiving the folded part 29 of the wiring harness 25. Therefore, an outer protruding part of the case 30 for receiving the folded part 29 is not required. A slim case is allowed to be used as the case 30.

INDUSTRIAL APPLICABILITY

Since a space for receiving folded part is provided between a case and an urging member, a slim case can be used as a case body. Therefore, a wiring harness slack absorbing device according to the present invention is applicable to such as a vehicle having a narrow space for mounting components.

The invention claimed is:

1. A wiring harness slack absorbing device comprising:
    a case having a base wall, front wall, rear wall, pair of side walls and a cover for receiving a wiring harness having an inlet formed in a side wall adjacent the rear wall, and an outlet formed in the rear wall for the wiring harness, said inlet being perpendicular to the outlet;
    an urging member for urging the wiring harness toward an inside of the case; and
    a harness roller around which the wiring harness is rolled and turned in a U-shape, said harness roller reciprocally moving under acting force of the urging member, wherein a space for receiving a folded part of the wiring harness formed by forming an overlap and then bending the wiring harness 90 degrees, is provided between the base wall of the case and the urging member, and
wherein the folded part of the wiring harness is led into the case through the inlet and received in the space, such that the wiring harness is led inside the case, rolled around the roller and turned in the U-shape, and led out through the outlet.

2. The wiring harness slack absorbing device as claimed in claim 1,
wherein a center axis of the urging member is displaced from a center plane of said harness roller in a direction of thickness of the device for providing a large said space for receiving the folded part of the wiring harness.

* * * * *